Oct. 17, 1933.   J. M. BOYKOW   1,931,282
AUTOMATIC STEERING DEVICE
Filed March 13, 1933   2 Sheets-Sheet 1

INVENTOR
JOHANN MARIA BOYKOW
BY
ATTORNEYS

Oct. 17, 1933.   J. M. BOYKOW   1,931,282
AUTOMATIC STEERING DEVICE
Filed March 13, 1933   2 Sheets-Sheet 2

INVENTOR
JOHANN MARIA BOYKOW
BY
ATTORNEYS.

Patented Oct. 17, 1933

1,931,282

UNITED STATES PATENT OFFICE 1,931,282

AUTOMATIC STEERING DEVICE

Johann Maria Boykow, Berlin-Lichterfelde-West, Germany

Application March 13, 1933, Serial No. 660,557, and in Germany March 12, 1932

10 Claims. (Cl. 244—29)

This invention relates to automatic steering or stabilizing devices and is more particularly adapted for the stabilization of aircrafts in regard of one, two or all three axes. For this purpose in a known manner measuring instruments are used, which are adapted to be influenced by deviations of the aircraft from normal position and which by means of auxiliary motors actuate the rudders in such a manner as to return the aircraft into its normal position. For this reason it is known to steer the ruddermotors by two relatively to each other displaceable switching elements, the one of which being actuated by the instruments measuring the said deviations and the other being influenced by the ruddermotor or another auxiliary motor to follow the first-named element. It has yet been proposed to displace the switching device against the tension of a spring or another elastic element. It is further known to use damping means for the said switching device. In all these known devices the springs or other elastic elements are arranged to abut directly upon the aircraft or respectively upon an element attached to the aircraft.

For the latter reason the known stabilizing devices will cause an oscillating movement of the aircraft about its normal position. It may be assumed a normal pendulum to be used for stabilizing the transverse position of the aircraft. If then the aircraft is deviating from its normal transverse position the aircraft will glide off to the right or the left perpendicular to its longitudinal axis. At first the transverse acceleration will influence the pendulum and the aircraft in the like manner and in consequence of this occurrence the pendulum will maintain or nearly maintain its position relatively to the aircraft. As soon as the aircraft is returning into its normal position, the transverse movement of the aircraft will be retarded and in consequence of this occurrence the pendulum will obtain a deflection, which is larger than the angle between the transverse axis of the aircraft and the vertical line. Therefore the pendulum will retain a small deflection, when the aircraft is already getting to its normal position. For this reason the steering means will be still influenced although the aircraft has reached its normal position.

An object of the invention is to provide means to overcome these disadvantages, more especially to provide means which will prevent the steering means to be influenced by the pendulum in the normal position of the aircraft. A further object of the invention is to form these compensating means so that the returning of the aircraft into its normal position is damped. The compensating means according to the invention may be combined with all measuring devices, used for steering of aircrafts, such as gyroscopes, pendulums or the like.

In the preferred embodiment of the invention two relatively to each other displaceable elements are used for switching the rudder machine, the one of which being actuated according to the stabilizing value, obtained by means of the measuring instruments, while the other of the said elements is moved according to the movement of the rudder. The first named element is coupled with an elastic member, for instance a spring, this member abutting upon another unelastic damped member. The instruments for measuring the deviation of the aircraft from its normal position may directly actuate the said switching element, coupled with the said elastic member. Preferably however the switching element may be actuated by an electromagnetic turning device influenced by one or more of the measuring instruments.

The invention is illustratively exemplified in the accompanying drawings, wherein Fig. 1 is a wiring diagram of one form of my invention, this form being determined for stabilizing an aircraft relatively to its vertical and longitudinal axis.

Figure 3:
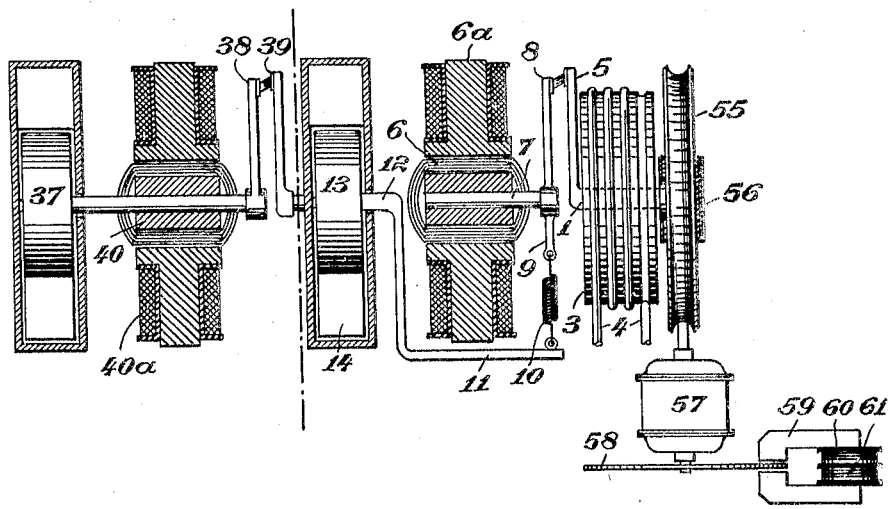
Fig. 3 is a sectional view illustrating the switching means and the auxiliary motor for driving the one of the two switching elements.

Referring to Fig. 3 the contact arm 8, carried by the rotatably mounted axle 7, and the contact track 5, carried by the axle 1, form the switching device for the ruddermotor and also for an auxiliary motor 57. The contact arm 8 is actuated by an electromagnetic turning device, comprising the rotor 6 and the stator 6a. The coils of parts 6 and 6a are, as will be described hereinafter, energized according to the stabilizing values, obtained by the measuring instrument. The contact arm 8 carries the arm 9 which is coupled by means of a spring 10 and a crank-lever 11 with the wheel of a hydraulic damping device, consisting of a rotor 13 and liquid-filled housing 14.

With the axle 1 of the contact track 5 is connected the drum 3 coupled by ropes 4 with the rudder not shown. The axle 1 is driven by means of a worm-wheel 55 and a worm 56 by the motor 57, switched by the contact device 5, 8. The axle of the motor 57 is coupled with an eddy-current brake, consisting of the copper disk 58 and the electromagnet 59, 60, 61. The one of the two coils 60 or 61 is always connected to an electrical source, the other being connected in series with the field-coils of the stator 6a and in this way supplied with a current proportional to the stabilizing value. The coils 60 and 61 are so wound respectively and so connected to the terminals of the source that the one of these coils will excite the core 59 in opposite sense to the other. Therefore with increasing of the current in the coils of the stator 6a and in the one of the coils 60 and 61 which is in series with the coils of the stator 6a, the braking effect of the device 58—61 will decrease.

Instead of the described electrical device may also be used a hydraulic or pneumatic brake, the regulation of which may be effected by a throttle-valve, actuated by an electromotive force against the tension of a spring, the electromotive force being regulated according to the stabilizing value.

From the above description will be clear that the purpose of the elements just described is to regulate the motor 57 in such a manner that the contact track 5, driven by that motor, will follow the contact arm 8 with a speed corresponding to the momentary stabilizing value.

In the following measuring instruments may be described which by means of the aforesaid switching device actuate the ruddermotors. As regards the gyroscope, illustrated in Figs. 4 and 5, which may be used for influencing the electromagnetic turning device shown in Fig. 3, the rotation axis 16 is directed horizontally and transversely to the direction of flight. The housing of the gyroscope is mounted with its horizontally directed axis 18 in the frame 17, the latter being rotatable about the vertical axis 19 of the gyroscope, which axis has its bearings on the carrier 20. As mentioned herein before the gyroscope may displace the contact arm 8 (Fig. 3) directly, its precession axis being coupled directly with the axle 7 (Fig. 3). In the embodiment, shown in Figs. 4 and 5, however, the gyroscope 15 is combined with resistances, consisting in a known manner of carbon or crystal, upon which the gyroscope will exercise pressure according to its precession. In consequence of this arrangement the precession movement of the gyroscope will be very small. This has the advantage that the gyroscope will always maintain its position relatively to the aircraft. According to Figs. 4 and 5 a pair of resistances 21 is provided for the transverse stabilization and a further pair of resistances 22 is provided for the stabilizing of the aircraft relatively to its vertical axis. Above each pair of the said resistances is rotatably mounted a lever 23 or 24, the lever 23 being actuated by the rodmechanism 25, when the gyroscope 15 is turning about the axle 19, the lever 24 being actuated directly by the turning axle 18. In this manner the resistances 21 and 22 are actuated by the precession of the gyroscope about the one or other axle, as the case may be. The resistances 21 are attached to the same base as the gyroscope carrier 20. The resistances 22 are connected with the frame 17 and therefore will rotate with the frame 17 about the axis 19.

Figures 1, 2:
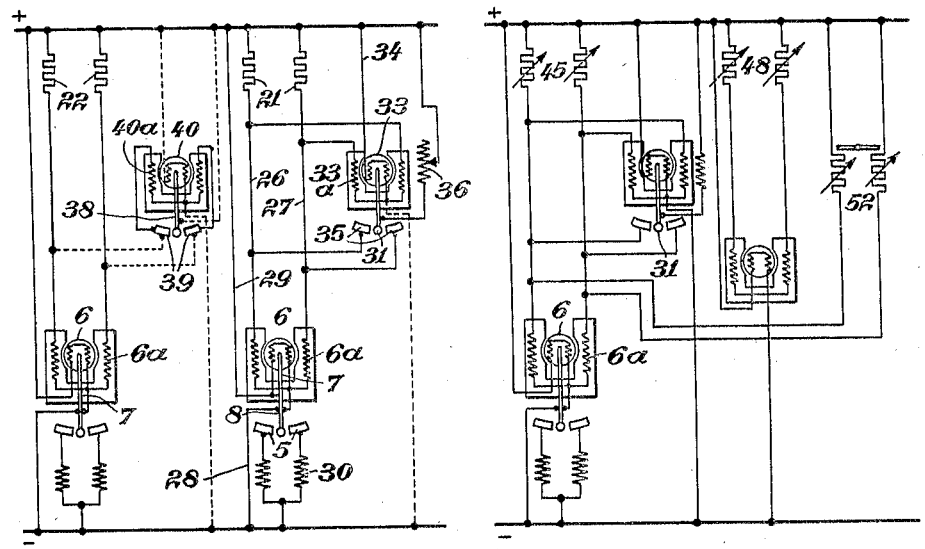
Fig. 2 is a wiring diagram of one embodiment, being adapted for the stabilizing of an aircraft relatively to its transverse axis.
Figure 4:
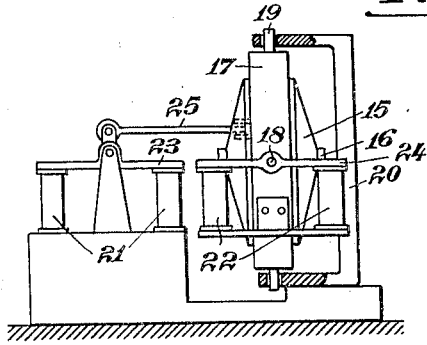
Figs. 4 and 5 show an elevation and plan of a gyroscope, adapted to influence the steering devices for stabilizing the aircraft relatively to its vertical as well as its longitudinal axis.
Figure 5:
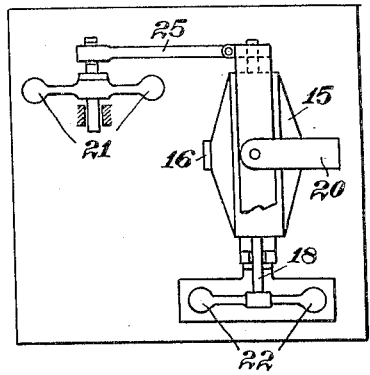

The wiring diagram of the resistance 21 and 22 according to Fig. 4 and of the electromagnetic turning device 6, 6a, shown in Fig. 3, is illustrated in Fig. 1 respectively to the transverse stabilization and to the stabilization of the aircraft about its vertical axis. The two resistances 21, serving for the transverse stabilization of the aircraft, are connected on their one terminals to the positive pole and on their other terminals across the lines 26 and 27 to the field coils 6a of the electromagnetic turning device; the other terminals of these field coils 6a are connected across the line 28 to the negative pole of the direct current source. The one terminal of the coil of the rotor 6 is connected across the line 9 to the positive pole of the current source, while the other terminal of the rotor coil is connected with the negative pole of the current source. The contact arm 8 is electrically connected to the positive pole. The contact track 5, contacted by the said contact arm 8, is connected to the field coils 30 of the ruddermotor not shown, the other terminals of the said field coils being connected to the negative pole of the current source. In a manner not shown the coils 60, 61 of the electromagnetic brake (Fig. 3) are also electrically connected to contact device 5, 8.

The mode of operation of the device, hereinbefore described, is as follows: When the aircraft turns about its longitudinal axis the gyroscope 15 will turn about the axle 19 relatively to its bearing 20. The rod mechanism 25 therefore will press down the one or the other end of the lever 23 and consequently the one or the other resistance 21 will be compressed. By the compressed resistance a current will be supplied to the field coil 6a of the electromagnetic turning device, in consequence of which the rotor 6 will rotate and bring the contact arm 8 in contact with the corresponding contact of the contact track 5. In this way the ruddermotor will be switched on and actuate the rudder. In consequence of the movement of the contact arm 8 the spring 10 (Fig. 3) is tensioned, which therefore will draw back the contact arm 8 into its initial position and also turn the wheel 13 of the hydraulic damping device. While the contact track 5 is turned synchronously with the movement of the rudder, the crank 11 changes its position influenced by the tension of the spring 10 in such a manner, that the contact arm 8 is turned as long as the aircraft has a deviation from its normal position. The auxiliary motor 30 will therefore continue to turn the rudder according to the damping intensity of the device 13, 14. In consequence of the displacement of the rudder the aircraft will return into its normal position and the pressure of the gyroscope upon the resistances 21 will decrease and therefore also the exciting of the electromagnetic turning device 6, 6a. In consequence of this the spring 10 will draw back the contact arm 8 and therefore the rudder will be removed.

As soon as the aircraft has reached its equilibrium, the spring 10 has lost its tension and the rudder has a position between its middle position and its maximal deflection having had before. By this remaining deflection of the rudder the aircraft will be turned in the opposite sense, the precession moment of the gyroscope reverses and the other of the two resistances 21 will be compressed. For this reason the crank 11 will be removed by the spring 10 and the electromagnetic turning device. During this time the rudder will be removed, will pass its middle position and will become an opposite deflection to damp the turning movement of the aircraft.

By dimensioning the spring 10 (Fig. 3) and the damping intensity of the device 13, 14 in a right manner, each desired damping effect of the oscillations of the aircraft about its longitudinal axis may be reached. If, for instance, the equilibrium of the aircraft relatively to its longitudinal axis is stable, the said damping effect will be chosen as a very strong one. If the said equilibrium is unstable, the said damping effect will be chosen as a small one.

Figure 9:
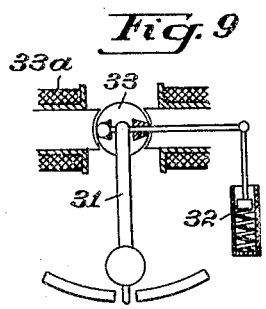
Fig. 9 represents a pendulum adapted to influence the steering means for transverse and longitudinal stabilization.

It will be advantageous if the transverse stabilizing device described before not only is influenced by the said gyroscope 15 but also by the pendulum represented in Fig. 9. The deflections of this pendulum are damped by a device 32. Turning moments proportional to the turning velocity of the aircraft will be exercised upon the pendulum by the electromagnetic turning devices 33, 33a, which are energized by means of the resistances 21, actuated by the gyroscope 15. These turning moments, electrically exercised, will compensate the damaging moments of the transverse acceleration of the aircraft. The turning axle of the pendulum is arranged in the direction of flight. The object of the pendulum is to prevent a constant deviation of the aircraft from its normal position.

The wiring diagram of the means for influencing the steering device for transverse stabilization by means of the pendulum 31 is also shown in Fig. 1. The field coils 33a of the electromagnetic turning device, influencing the pendulum is connected in series with the resistances 21 to the positive pole of the current source. The rotor of the electromagnetic turning device will be supplied by means of the line 34. The field coils 6a are supplied with current flowing from the one pole of the current source through the resistance 36, the contact device 35, 31 and the said field coils to the other pole of the current source. The resistance 36 is provided for regulating the current in the said circuit.

If the embodiment shown in Fig. 3 is to be used for steering the aircraft relatively to its vertical axis, this embodiment is to be completed by the elements illustrated on the left-hand side of the dotted line. To the axle of the wheel 13 an arm with the contact track 39 is attached. If this contact track 39 is displaced relatively to the contact 38, the electromagnetic turning device 40, 40a as well as the electromagnetic turning device 6, 6a will be switched on, both electromagnetic turning devices being connected to the contact device 38, 39. In consequence whereof the damping device 37, which may be alike the damping device 13, 14, will only begin to actuate, if the sum of the deviations of the aircraft from its normal position will tend to the same side. The turning angle of the arm 11 and also of the wheel 13, transmitted by the spring 10, is obviously proportional to the momentary deviation of the aircraft from the line of course, if the first named electromagnetic turning device 6, 6a produces a turning moment proportional to the angular velocity of the deviations of the aircraft from the course line. The turning moment, produced by means of the electromagnetic turning device 6, 6a, if the contact track 39 is moved relatively to the contact arm 38, is proportional to an angular velocity as well as that turning moment, which is exercised by the electromagnetic turning device 40, 40a upon the damping device 37. If the damping intensity in both damping devices is chosen in a right manner, the aircraft will be returned to the right course, when the positions of the damping elements correspond to each other.

On the lefthand side of Fig. 1 the wiring diagram for the steering device relatively to the vertical axis is represented. In this case the electromagnetic turning device 6, 6a is electrically connected to the resistances 22 (Figs. 4, 5), which resistances will be actuated by the gyroscope 15 according to the deviation of the aircraft from the right course. The coil of the rotor 40 is connected across the current source. The contact arm 38 of this turning device is connected to the positive pole of the current source. The corresponding contact track 39 is connected to the field coils 40a respectively 6a of the two electromagnetic turning devices.

Figure 8:
Fig. 8 shows another form of a spring balance for measuring the vertical acceleration of the aircraft.
Figure 8:
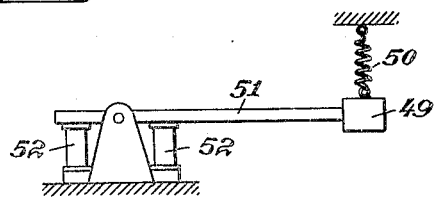

As a steering instrument for the longitudinal stabilization device, the wiring diagram of which being shown in Fig. 2, the spring balance illustrated in Fig. 8, is used. The weight 49 attached to the arm 51 is balanced by means of the spring 50. The turning axle of the arm 51 is arranged in the direction of flight. The weight 49, influenced by vertical accelerations, tends to move above or down as the case will be; in consequence of which the one of the two resistances 32 will be compressed, by which occurrence the current supplied to the field coils 6a will be regulated. Although the said spring balance will be influenced only by vertical accelerations, attention is directed to the fact that each turning movement of the aircraft about its transverse axis will be accompanied with a vertical acceleration, because each turning movement of the aircraft about its transverse axis is in fact a curved course in a vertical plane and therefore excites a centrifugal acceleration.

Figure 7:
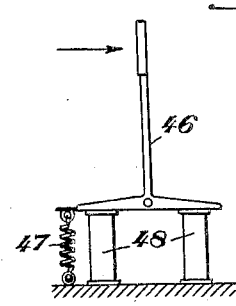
Fig. 7 shows a device measuring the relative velocity of the aircraft.

Fig. 7 shows a plate 46 adapted to measure the relative speed of the aircraft. The turning moment exercised by the relative wind-velocity is balanced by means of the spring 47. When the relative speed of the aircraft is larger or smaller than the value to be maintained, the arm 46 will turn to the one or the other side and compress the one or the other of the two resistances 48.

Figure 6:
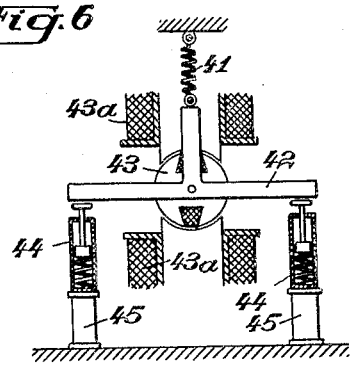
Fig. 6 shows a spring-balance for the longitudinal stabilization.

For transmitting the deviations from the relative speed, to be maintained, a spring balance, as illustrated in Fig. 6, may be used. The spring 41 tends to maintain the balance lever 42 in the middle position, which balance lever is adapted to be influenced by means of the turning device 43, 43a. The balance lever 46 acts on each end by means of elastic damping elements 44 upon resistances 45, for instance, consisting of carbon. The said spring balance may be used especially when the aircraft will deviate very much from its middle position.

Figure 10:
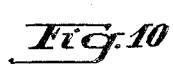
Fig. 10 shows a combination of the elements represented in Figs. 6–8.
Figure 10:
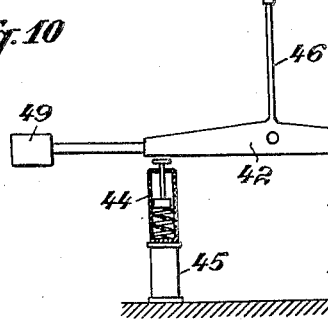

The pendulum described may be used also in combination with the steering means for longitudinal stabilization of the aircraft. Fig. 10 represents substantially a combination of all the elements, illustrated in Figs. 6, 7 and 8. The respective elements are designed with the same references used in Figs. 6–8. It also is possible to combine only the elements illustrated in Figs. 6 and 7.

The wiring diagram of the measuring instruments, used for the steering of the aircraft about its transverse axis are shown in Fig. 2 as regards this diagram, all described arrangements according to Figs. 6–9, parallel with each other influence the field of the electromagnetic turning device 6, 6a, which by means of the arrangement shown in Fig. 3 switches the ruddermotor.

I claim as my invention:

1. In stabilizing devices of the type described a stabilizing device, a switching device for the ruddermotor, comprising two switching elements adjustable relatively to each other, means for adjusting the one of said switching elements according to the stabilizing value of the stabilizing device, means for adjusting the other of said switching elements according to the movement of the rudder, elastic means, connected on their one side to the first named switching element, and an unelastic damped element, upon which the said elastic means are abutting.

2. In stabilizing devices of the type described a stabilizing device, a switching device for the ruddermotor, comprising two switching elements adjustable relatively to each other, means for adjusting the one of said switching elements according to the stabilizing value of the stabilizing device, means for adjusting the other of said switching elements according to the movement of the rudder, a spring, an unelastic damped element, said spring connecting said first named switching element to said unelastic damped element.

3. In stabilizing devices of the type described a stabilizing device, a switching device for the ruddermotor, comprising two switching elements adjustable relatively to each other, means for adjusting the one of said switching elements according to the stabilizing value of the stabilizing device, means for adjusting the other of said switching devices according to the movement of the rudder, a spring, a rotatably hydraulic damping device, said spring connecting the first named switching element and said hydraulic damping device.

4. In stabilizing devices of the type described a switching device for the ruddermotor, comprising two switching elements adjustable relatively to each other, instruments measuring the stabilizing value, an electromagnetic turning device for adjusting one of said switching elements, said turning device regulatively connected to said instruments, means for adjusting the other of said switching elements according to the movement of the rudder, a spring, an unelastic damped element, said spring connecting the first named switching element and the said unelastic damped element.

5. In stabilizing devices of the type described a stabilizing device, a switching device for the ruddermotor, comprising two switching elements adjustable relatively to each other, means for adjusting the one of said switching elements according to the stabilizing value of the stabilizing device, means for adjusting the other of said switching elements, according to the movement of the rudder, a rotatable hydraulic damping device and elastic means, connecting the first named switching element and said hydraulic damping device, the axis of rotation of said switching elements and of said rotatable damping device coaxially with each other mounted.

6. In stabilizing devices of the type described a switching device for the ruddermotor, comprising a contact arm, a contact track, said contact arm and contact track rotatably mounted, instruments for measuring the stabilizing values, an electromagnetic turning device, coupled with the axis of rotation of said contact arm, a regulating connection between said turning device and said measuring instruments, means for adjusting said contact track according to the rudder movement, a hydraulic damping device and a spring connecting said contact arm and said hydraulic damping device.

7. In stabilizing devices of the type described a switching device for the rudder motor, comprising two switching elements adjustable relative to each other, means for adjusting the first of said elements according to the stabilizing value, means for damping the movement of said first switching element, a motor adjusting the second of the said switching elements, said motor switched on by the said two switching elements and a brake for this motor automatically regulatable according to the relative adjustment between said two switching elements.

8. In stabilizing devices of the type described a switching device for the rudder motor, comprising two switching elements adjustable relative to each other, means for adjusting the first of said elements according to the stabilizing value, means for damping the movement of said first switching element, a motor adjusting the second of the said switching elements, said motor switched on by the said two switching elements and an electromagnetic brake for this motor, consisting of a brake-disk on the axis of said motor and an electromagnet with two oppositely wound coils, the one of which being connected to the said two switching elements, the other being supplied by a constant current source.

9. In stabilizing devices of the type described a steering device for the ruddermotor, comprising two switching elements adjustable relative to each other, means for adjusting the one of said elements, according to the movement of the rudder, an unelastic damped element, connected with the other of said two switching elements by means of a spring, a spring balance adjusting the last named switching element.

10. In stabilizing devices of the type described a steering device for the ruddermotor, comprising two switching elements adjustable relative to each other, means for adjusting the one of said elements according to the movement of the rudder, an unelastic damped element, connected with the other of said two switching elements by means of a spring, an electromagnetic turning device adjusting the last named switching element, a gyroscope, a pendulum and a regulating connection between said pendulum and gyroscope on the one side and said electromagnetic turning device on the other side.

JOHANN MARIA BOYKOW.